(12) United States Patent
Erwin et al.

(10) Patent No.: US 8,056,018 B2
(45) Date of Patent: Nov. 8, 2011

(54) IMPLEMENTING REGISTRATION AND CONFLICT RESOLUTION OF WEB APPLICATION KEYBOARD SHORTCUTS

(75) Inventors: Anthony Wayne Erwin, Rochester, MN (US); Timothy Charles Mossing, Rochester, MN (US); Christopher A. Robbins, New York, NY (US); Brian Owen Wood, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 11/688,320

(22) Filed: Mar. 20, 2007

(65) Prior Publication Data

US 2008/0235789 A1 Sep. 25, 2008

(51) Int. Cl.
*G06F 3/048* (2006.01)
(52) U.S. Cl. .................. 715/847; 715/760; 715/827
(58) Field of Classification Search .................. 715/847, 715/760, 827
See application file for complete search history.

(56) References Cited

U.S. PATENT DOCUMENTS

| | | | | |
|---|---|---|---|---|
| 6,057,845 | A  * | 5/2000 | Dupouy | 715/863 |
| 7,028,019 | B2 * | 4/2006 | McMillan et al. | 707/691 |
| 7,111,243 | B1 * | 9/2006 | Ballard et al. | 715/744 |

OTHER PUBLICATIONS http://www.mezzoblue.com/archives/2005/01/05/keyboards_an, "Keyboards and Chaos", dated Jan. 5, 2005.

* cited by examiner

*Primary Examiner* — Steven Sax
*Assistant Examiner* — Andrey Belousov
(74) *Attorney, Agent, or Firm* — Joan Pennington

(57) ABSTRACT

Conflict resolution of web application keyboard shortcuts implementation includes a web application being loaded in a web browser and application keyboard shortcuts for the web application are registered with the web browser. The web browser identifies application keyboard shortcuts for the web application that conflict with keyboard shortcuts for the web browser. Then the web browser resolves each conflict.

11 Claims, 5 Drawing Sheets

IMPLEMENTING REGISTRATION AND CONFLICT RESOLUTION OF WEB APPLICATION KEYBOARD SHORTCUTS

FIELD OF THE INVENTION

The present invention relates generally to the data processing field, and more particularly, relates to a method, system and computer program product for implementing registration and conflict resolution of web application keyboard shortcuts.

DESCRIPTION OF THE RELATED ART

There is an increasing trend to migrate traditional personal and business applications to the web. The benefits are widely known, and even the most traditional of desktop applications, such as, word processing, spreadsheet, and file management applications, are being implemented as web applications.

However, users of these web applications are clamoring for these applications to be more than just "web pages" and to behave like the traditional applications that they are accustomed to using, especially in the areas of usability and accessibility.

To satisfy power users as well as accessibility requirements, keyboard shortcuts or accelerators for web applications are seen as essential. However, since a web application runs inside a containing application or the web browser, it is difficult to assign particular keyboard shortcuts to a web application and guarantee that these shortcuts will not conflict with a keyboard shortcut registered by the web browser itself.

There are a few partial solutions to this issue of collisions in web application keyboard shortcuts, but each has significant shortcomings:

Use of DHTML Event Handling

A web application can receive and react to keyboard input. If an application function corresponds to the input, it can react. However, this action can be followed by the browser potentially executing a corresponding action if it has a function bound to the same respective keyboard combination. There is also potential for the web application to react to the keyboard input and consume it without giving the browser a chance to process the keyboard input, this presents significant usability and security issues.

Use of the Accesskey HTML Attribute

While meant to be an accessibility benefit, the accesskey function has been more of an accessibility detriment since it is supported inconsistently across browsers and operating systems. Also, studies have shown that usage of this HTML feature actually makes a page less accessible.

Assigning Non-Standard/Complex Key Combinations

Although assigning non-standard or complex key combinations to web application functions in an effort to avoid collisions with registered browser shortcuts may work, it would decrease usability and heighten user confusion due to the application shortcuts being mapped to non-obvious key bindings. Even if the keyboard shortcut used within the web application does not produce a collision in the current browser releases, a browser add-on/extension or later release of the browser may claim the previously unused shortcut combination.

A need exists for an effective mechanism for implementing registration and conflict resolution of web application keyboard shortcuts.

SUMMARY OF THE INVENTION

Principal aspects of the present invention are to provide a method, system and computer program product for implementing registration and conflict resolution of web application keyboard shortcuts. Other important aspects of the present invention are to provide such method, system and computer program product for implementing registration and conflict resolution of web application keyboard shortcuts substantially without negative effect and that overcome many of the disadvantages of prior art arrangements.

In brief, a method, system, and computer program product are provided for implementing registration and conflict resolution of web application keyboard shortcuts. A web application is loaded in a web browser and application keyboard shortcuts for the web application are registered with the web browser. The web browser identifies application keyboard shortcuts for the web application that conflict with keyboard shortcuts for the web browser. The web browser resolves each conflict.

In accordance with features of the invention, a selected keyboard shortcut for the web browser is remapped or a new key combination is registered. The web browser presents a choice to the user of the web application keyboard shortcut or the web browser keyboard shortcut for a detected conflict when a web application keyboard shortcut is invoked. The web browser invokes the user-selected function of the web application or the web browser. The web browser presents an option enabling the user to store the result of the choice in a browser persistence framework to avoid future conflicts.

In accordance with features of the invention, a HTML tag implements a keyboard shortcut registration mechanism. The web browser reads in a key=value pairs within a predefined attribute of a META tag.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance in features of the invention, a web application is enabled to register keyboard shortcuts with the browser upon application initialization.

This allows the browser to handle any application/browser keyboard shortcut conflicts gracefully. Increased usability and accessibility for web applications are gained by virtue of allowing these applications to register keyboard shortcuts for commonly used features without having to bind functions to esoteric key combinations and be worried that the key combination currently used by the application may collide with a browser function in a future release of the browser.

In accordance in features of the invention, since the browser is aware of each key combination it has registered and now has the knowledge of what keyboard combinations are requested by the web application, the browser responds appropriately if a conflict is encountered. For example, if a web application registers the shortcut CTRL+O, the browser could present the user with a choice between the browser function mapped to CTRL+O (open a file) or the web application function mapped to CTRL+O. Furthermore, based on user preference, the browser advantageously remembers to always perform the specified function upon a particular keyboard combination conflict for a specific application. The browser may also wish to remap its corresponding function's key binding to another key combination to avoid any future conflicts.

Figure 1:
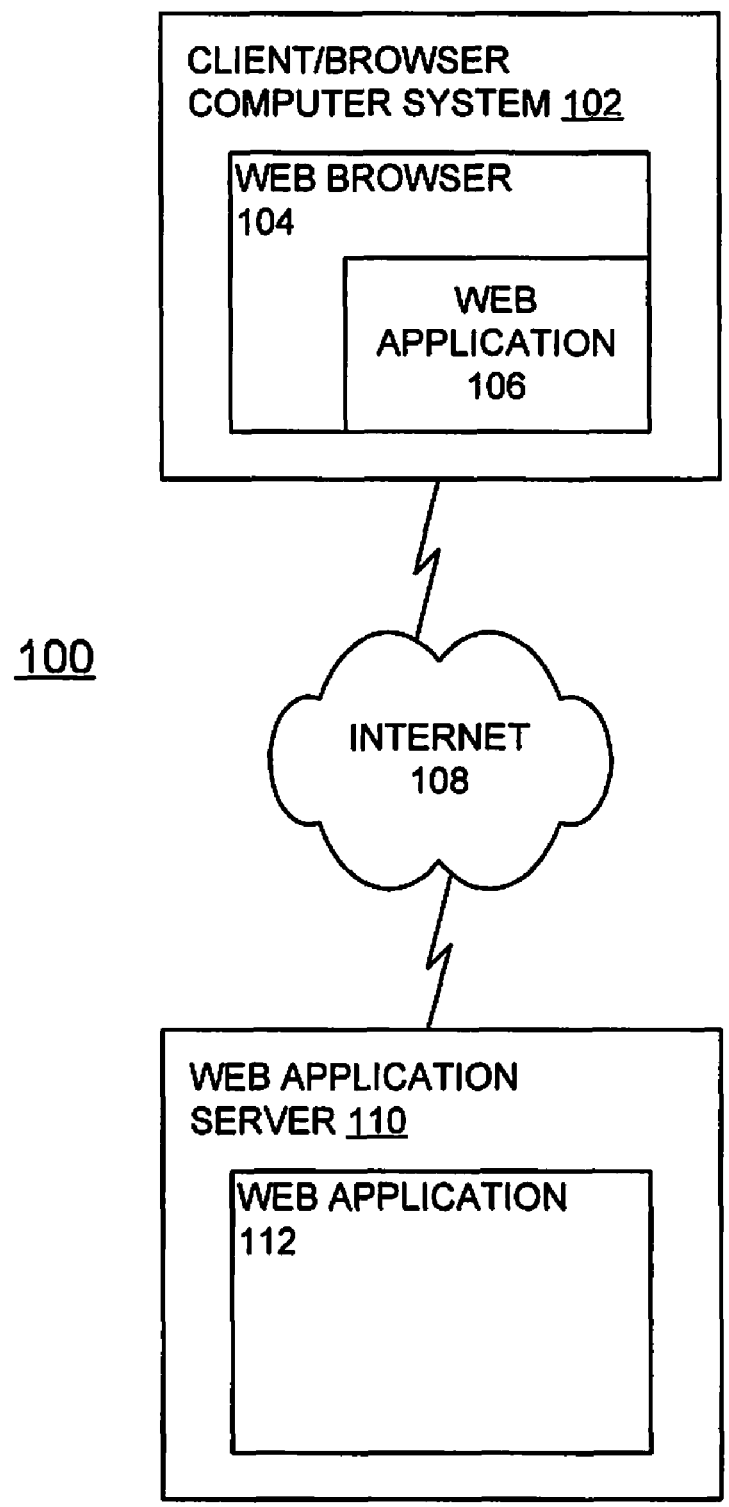
FIG. 1 is a block diagram illustrating an exemplary system for implementing registration and conflict resolution of web application keyboard shortcuts in accordance with the preferred embodiment.

Having reference now to the drawings, in FIG. 1, there is shown an exemplary computer system generally designated by the reference character 100 for implementing registration and conflict resolution of web application keyboard shortcuts in accordance with the preferred embodiment. Computer system 100 includes a client or browser machine or client system 102 including a web browser 104 including a web application 106.

Computer system 100 includes a communications network, such as the Internet 108, connecting the client system 102 to a web application server 110. The web application server 110 includes a web application 112 for implementing registration and conflict resolution of web application keyboard shortcuts in accordance with the preferred embodiment.

Figure 2:
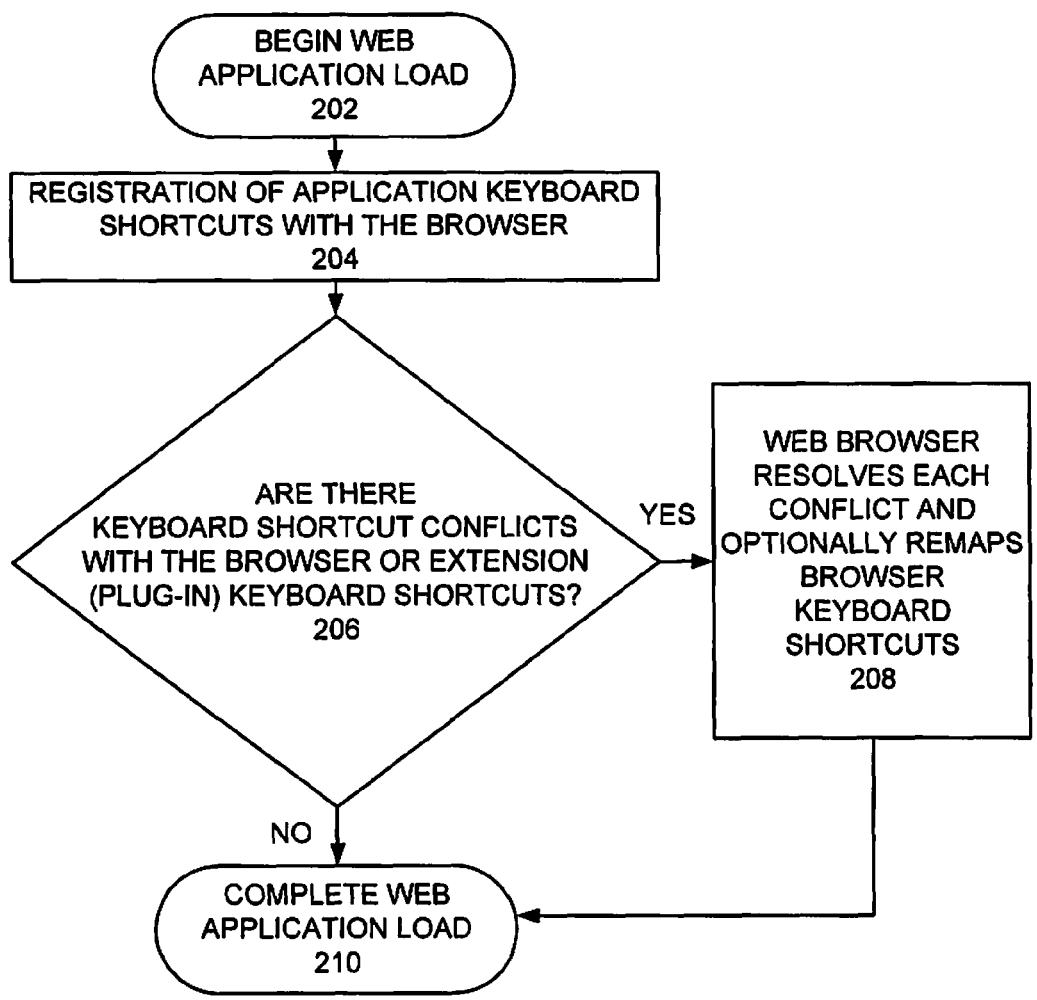
FIGS. 2, 3A, and 3B are flow charts illustrating exemplary steps for implementing registration and conflict resolution of web application keyboard shortcuts in accordance with the preferred embodiment.
Figure 3A:
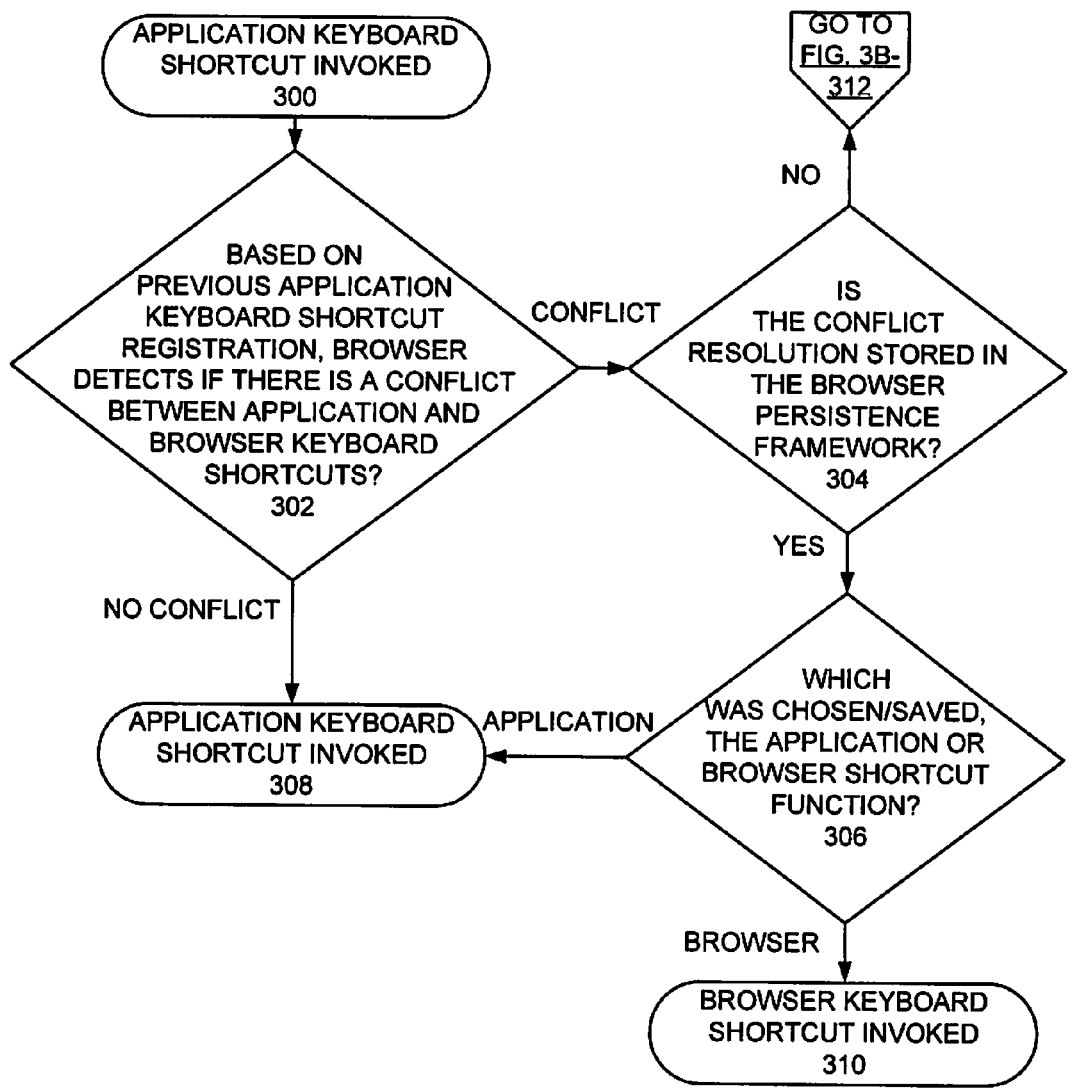
Figure 3B:
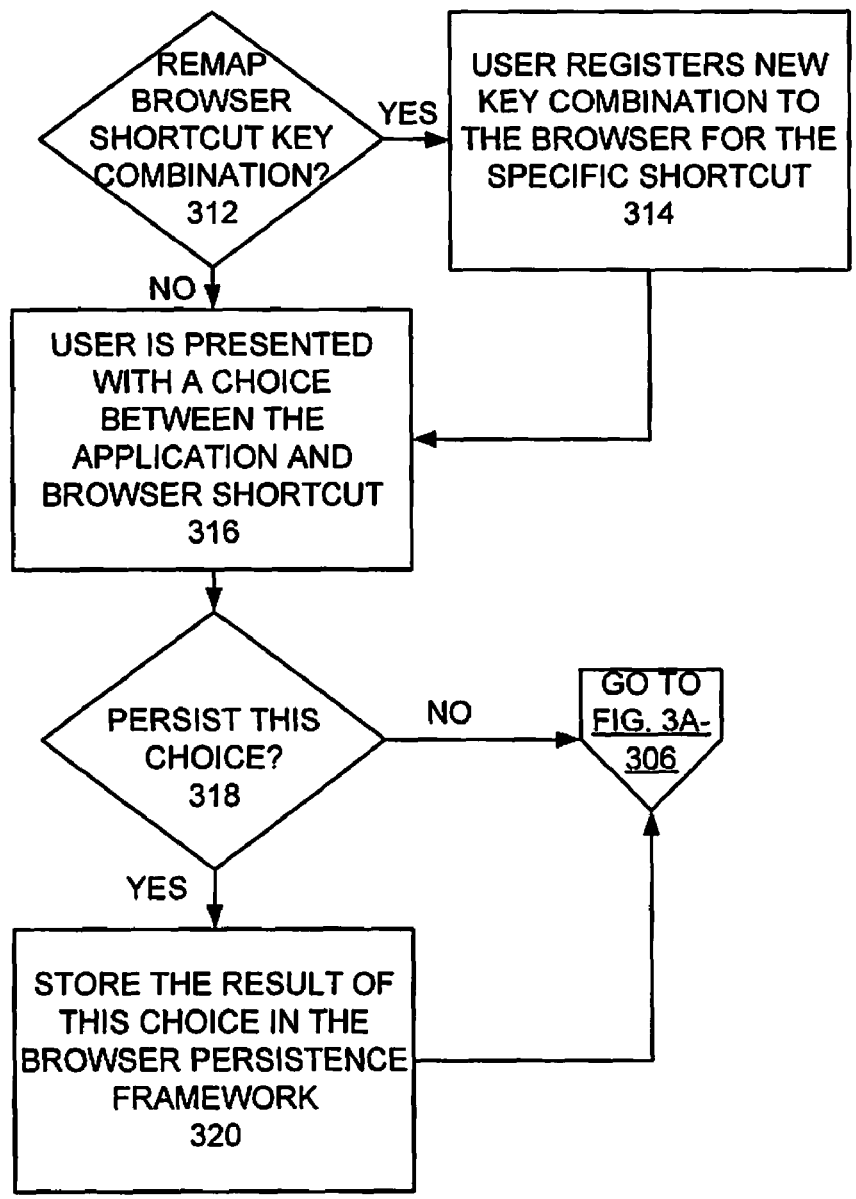

Referring to FIGS. 2, 3A, and 3B, there are shown exemplary steps for implementing registration and conflict resolution of web application keyboard shortcuts in accordance with the preferred embodiment.

In accordance in features of the invention, a registration mechanism is provided together with browser cooperation in the recognition and support of handling any keyboard input collisions. In order to reduce the effort needed to comply with this invention, a standard HTML tag advantageously can be used as the shortcut registration mechanism.

For example, the following META tag could be used to register application shortcuts for an on-line map application where the key=value pairs in the CONTENT attribute would be the shortcut key combination paired with the corresponding function description.

<META NAME="KEYBOARD_SHORTCUTS" CONTENT="F2=Zoom In, F3=Zoom Out, CTRL+O=Open Graph Data, CTRL+E=Export Graph Data">

In accordance in features of the invention, the browser 104 then reads in the key=value pairs within the CONTENT attribute in the META tag. Once the application's shortcuts are registered with the browser, then the browser can gracefully handle any keyboard shortcut collisions. Optimally, conflict resolution is accomplishes by the browser presenting a choice to the user indicating which browser and application functions correspond to the entered keyboard shortcut. This presented choice also enables the user to mark one of the presented functions as the preferred function corresponding to the entered keyboard combination or essentially telling the browser to remember to perform the selected function in the future (without asking again) should this specific browser/application conflict ever happen again. In addition, the browser advantageously can choose to resolve these conflicts by giving the user the opportunity to remap certain browser or web application functions to alternative keyboard shortcuts.

Referring now to FIG. 2, initially a web application 106 is loaded as indicated at a block 202. Next as indicated at a block 204, registration of application keyboard shortcuts with the browser 104 is performed during initialization of the web application load.

The registration of web application keyboard shortcuts allows the browser 104 to show a 'cheat sheet' of shortcuts and corresponding functions that are available for a particular application 106. This shortcut cheat sheet dialog advantageously identifies any existing keyboard shortcut conflicts and allows the user to remap shortcut key bindings before potential conflicts actually occur. Besides providing a proactive measure to resolve keyboard conflicts, this function assists the user in becoming familiar with an application 106 and its usage by listing the available keyboard shortcuts and corresponding functions.

Checking for any keyboard shortcut conflicts with the browser or browser extension (plug-in) shortcuts is performed as indicated at a decision block 206.

When any shortcut conflicts are identified, each conflict is resolved and possibly browser keyboard shortcuts are remapped as indicated at a block 208. When no shortcut conflicts are identified, or after each conflict is resolved at block 208, then the web application load is completed as indicated at a block 210.

Novel implementation features of the invention include guarding the user from keyboard shortcut conflicts between the web application and browser, and allowing web applications greater liberty and quality assurance in the area of keyboard shortcuts within their applications. The end results are a more empowered user due to the enhanced capability of the browser to handle any keyboard input conflicts and web applications more apt to take advantage of keyboard shortcuts within their code.

Referring now to FIGS. 3A, and 3B, during operation of the web application an application keyboard shortcut is invoked as indicated at a block 300. Checking is performed by the browser 104 as indicated at a decision block 302 based upon previous application keyboard shortcut registration to detect if there is a conflict between the application and browser keyboard shortcuts.

When a conflict is identified, the browser 104 checks to determine whether the conflict resolution is stored in the browser persistence framework as indicated at a decision block 304.

When the conflict resolution is stored in the browser persistence framework, the browser 104 checks to determine whether the application or browser shortcut function was chosen or saved as indicated at a decision block 306. When the application shortcut function was chosen or saved, then the application keyboard shortcut is invoked as indicated at a block 308. When the browser shortcut function was chosen or saved, then the browser keyboard shortcut is invoked as indicated at a block 310.

Referring now to FIG. 3B when determined at decision block 304 in FIG. 3A that the conflict resolution is not stored in the browser persistence framework, then the sequential operations continue with the browser 104 checking to remap the browser shortcut key combination as indicated at a decision block 312. If yes, then the user registers a new key combination to the browser for the specific shortcut as indicated at a block 314. Otherwise, the user is presented with a choice between the application and browser shortcut as indicated at a block 316. Then the browser 104 checks whether to persist this choice as indicated at a decision block 318. If yes, the browser 104 stores the result of this choice in the browser persistence framework as indicated at a block 320. If not or after the browser 104 stores the result at block 320, then the sequential operations continue with the browser 104 checking to determine whether the application or browser shortcut function was chosen or saved at decision block 306 in FIG. 3A.

Figure 4:
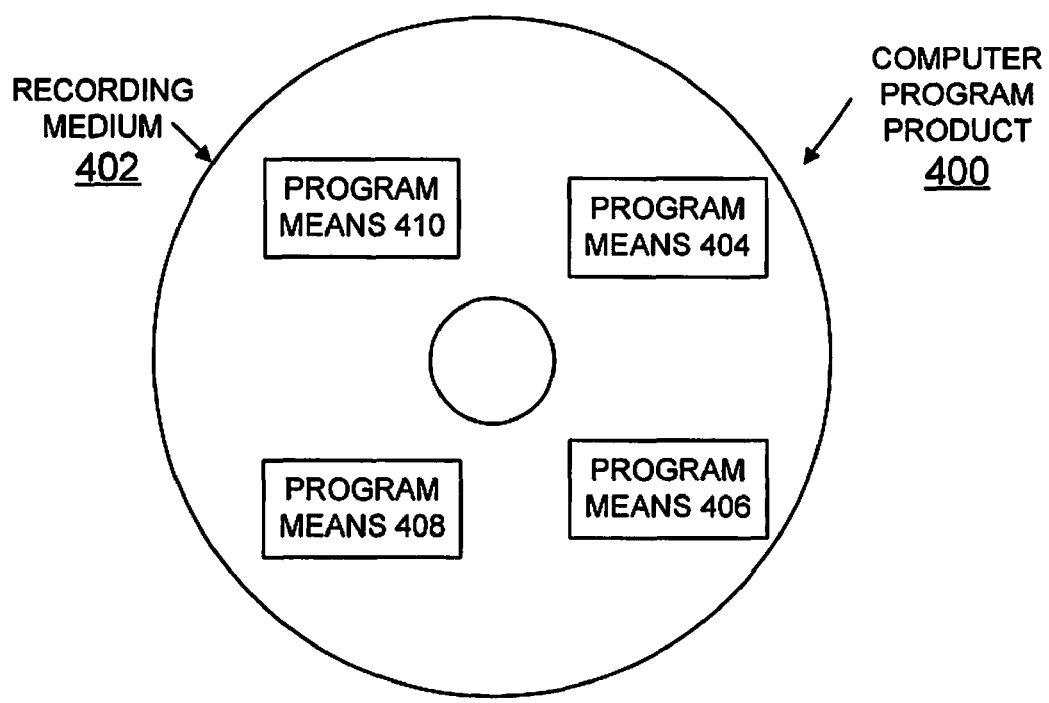
FIG. 4 is a block diagram illustrating a computer program product in accordance with the preferred embodiment.

Referring now to FIG. 4, an article of manufacture or a computer program product 400 of the invention is illustrated.

The computer program product 400 includes a recording medium 402, such as, a floppy disk, a high capacity read only memory in the form of an optically read compact disk or CD-ROM, a tape, or another similar computer program product. Recording medium 402 stores program means 404, 406, 408, 410 on the medium 402 for carrying out the methods for implementing registration and conflict resolution of web application keyboard shortcuts of the preferred embodiment in the system 100 of FIG. 1.

A sequence of program instructions or a logical assembly of one or more interrelated modules defined by the recorded program means 404, 406, 408, 410, direct the computer system 100 for implementing registration and conflict resolution of web application keyboard shortcuts of the preferred embodiment.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

While the present invention has been described with reference to the details of the embodiments of the invention shown in the drawing, these details are not intended to limit the scope of the invention as claimed in the appended claims.

What is claimed is:

1. A method for implementing registration and conflict resolution of web application keyboard shortcuts performed by a web browser, said method comprising:
    begin loading a web application in the web browser;
    registering a plurality of web application keyboard shortcuts for the web application with the web browser; using a HTML tag for implementing a keyboard shortcut registration mechanism, displaying said plurality of said application keyboard shortcuts with corresponding functions and allowing a user to remap shortcut key bindings for selected ones of said plurality of web application keyboard shortcuts;
    remapping a selected keyboard shortcut for the web browser;
    identifying a conflict between one of said plurality of web application keyboard shortcuts for the web application with a keyboard shortcut for the web browser;
    responsive to registering said plurality of web application keyboard shortcuts, checking for a conflict between each of said plurality of web application keyboard shortcuts for the web application and a keyboard shortcut for the web browser;
    resolving the identified conflict;
    responsive to resolving the identified conflict or responsive to not identifying a conflict, completing the web application load;
    presenting a choice to the user of the web application keyboard shortcut or the web browser keyboard shortcut for a detected conflict when a web application keyboard shortcut is invoked; and
    identifying and invoking a conflict resolution stored in a browser persistence framework responsive to identifying a conflict between one of said plurality of web application keyboard shortcuts for the web application with a keyboard shortcut for the web browser during operation of the web application.

2. The method for implementing registration and conflict resolution of web application keyboard shortcuts as recited in claim 1 further includes invoking user-selected function of the web application or the web browser.

3. The method for implementing registration and conflict resolution of web application keyboard shortcuts as recited in claim 1 further includes presenting an option enabling the user to store the result of the choice in a browser persistence framework.

4. The method for implementing registration and conflict resolution of web application keyboard shortcuts as recited in claim 1 further includes reading in a key=value pair within a predefined attribute of a META tag for implementing a keyboard shortcut.

5. A non-transitory computer program product for implementing registration and conflict resolution of web application keyboard shortcuts in a computer system, said computer program product including instructions stored on a non-transitory computer readable storage medium, wherein said instructions, when executed by the computer system to cause the computer system to perform the steps of:
    begin loading a web application in a web browser;
    registering a plurality of web application keyboard shortcuts for the web application with the web browser; using a HTML tag for implementing a keyboard shortcut registration mechanism, displaying said plurality of said application keyboard shortcuts with corresponding functions and allowing a user to remap shortcut key bindings for selected ones of said plurality of web application keyboard shortcuts;
    remapping a selected keyboard shortcut for the web browser;
    responsive to registering said plurality of web application keyboard shortcuts, checking for a conflict between each of said plurality of web application keyboard shortcuts for the web application and a keyboard shortcut for the web browser;
    identifying a conflict between one of said plurality of web application keyboard shortcuts for the web application with a keyboard shortcut for the web browser;
    resolving the identified conflict;
    responsive to resolving the identified conflict or responsive to not identifying a conflict, completing the web application load;
    presenting a choice to the user of the web application keyboard shortcut or the web browser keyboard shortcut for a detected conflict when a web application keyboard shortcut is invoked; and
    identifying and invoking a conflict resolution stored in a browser persistence framework responsive to identifying a conflict between one of said plurality of web application keyboard shortcuts for the web application with a keyboard shortcut for the web browser during operation of the web application.

6. The computer program product for implementing registration and conflict resolution of web application keyboard shortcuts as recited in claim 5 further includes invoking a user selected function of the web application or the web browser.

7. The computer program product for implementing registration and conflict resolution of web application keyboard shortcuts as recited in claim 5 further includes presenting an option enabling the user to store the result of the choice in a browser persistence framework.

8. The computer program product for implementing registration and conflict resolution of web application keyboard shortcuts as recited in claim 5 further includes reading in a key=value pair within a predefined attribute of a META tag for implementing a keyboard shortcut.

9. A system for implementing registration and conflict resolution of web application keyboard shortcuts comprising:
- a client computer system; said client computer system including a web browser;
- a web application being loaded into said web browser;
- said web browser registering a plurality of web application keyboard shortcuts for the web application with the web browser during initialization; said web browser using a HTML tag for implementing a keyboard shortcut registration mechanism, said web browser displaying said plurality of said application keyboard shortcuts with corresponding functions and allowing a user to remap shortcut key bindings for selected ones of said plurality of web application keyboard shortcuts;
- said web browser responsive to registering said plurality of web application keyboard shortcuts, checking for a conflict between each of said plurality of web application keyboard shortcuts for the web application and a keyboard shortcut for the web browser;
- said web browser remapping a selected keyboard shortcut for the web browser;
- said web browser identifying a conflict between one of said plurality of web application keyboard shortcuts for the web application with a keyboard shortcut for the web browser;
- said web browser resolving the identified conflict;
- said web browser responsive to resolving the identified conflict or responsive to not identifying a conflict, completing the web application load;
- said web browser presenting a choice to the user of the web application keyboard shortcut or the web browser keyboard shortcut for a detected conflict when a web application keyboard shortcut is invoked; and
- said web browser identifying and invoking a conflict resolution stored in a browser persistence framework responsive to identifying a conflict between one of said plurality of web application keyboard shortcuts for the web application with a keyboard shortcut for the web browser during operation of the web application.

10. The system for implementing registration and conflict resolution of web application keyboard shortcuts as recited in claim 9 further includes said web browser invoking a user-selected function of the web application or the web browser.

11. The system for implementing registration and conflict resolution of web application keyboard shortcuts as recited in claim 10 further includes said web browser presenting an option enabling the user to store the result of the choice in a browser persistence framework.

* * * * *